Figures 1, 2:
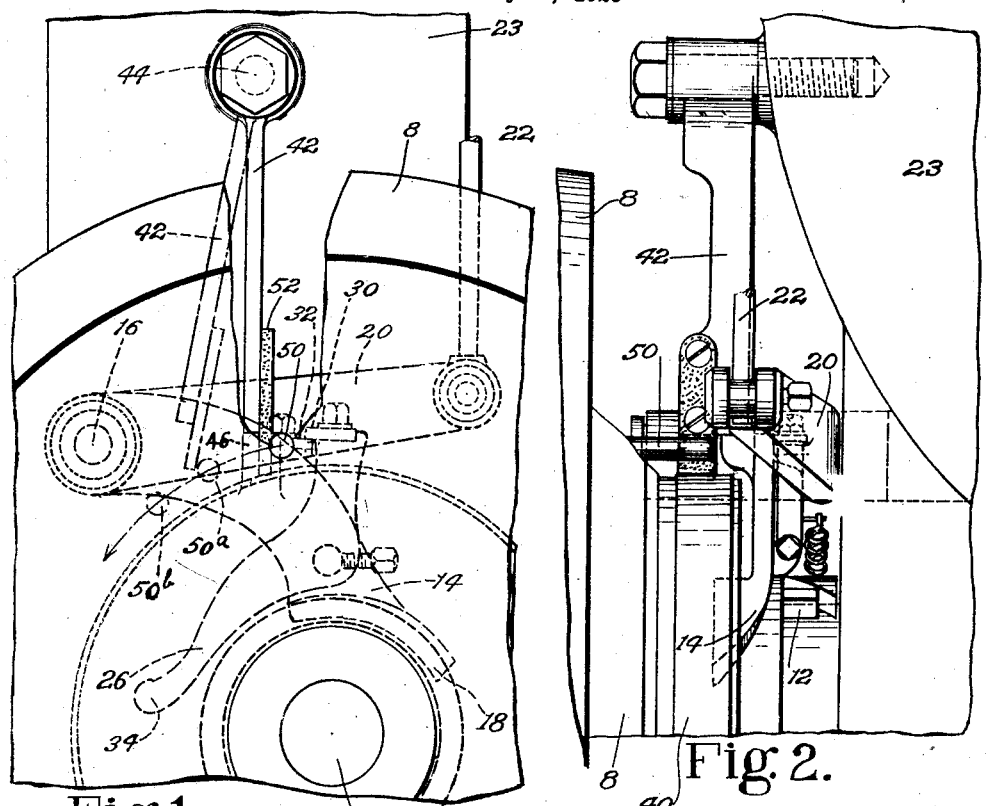

Sept. 11, 1928.

P. J. O'SULLIVAN 1,683,693

SAFETY DEVICE

Filed July 25, 1923

INVENTOR
Patrick J. O'Sullivan
By his Attorney,
Nelson N. Howard

Patented Sept. 11, 1928.

1,683,693

UNITED STATES PATENT OFFICE.

PATRICK JOSEPH O'SULLIVAN, OF WOODSIDE, NEW YORK, ASSIGNOR TO UNITED SHOE MACHINERY CORPORATION, OF PATERSON, NEW JERSEY, A CORPORATION OF NEW JERSEY.

SAFETY DEVICE.

Application filed July 25, 1923. Serial No. 653,784.

This invention relates to safety devices for use in connection with starting and stopping mechanisms of machines and is herein illustrated as embodied in a clicking machine of the type disclosed in United States Letters Patent No. 921,503, granted May 11, 1909 upon application of Arthur Bates, but it is to be understood that the invention is adapted for use in connection with machines of other types.

Ordinarily the starting lever, by which an operator controls his machine, is located in a readily accessible position at the front of the machine. Because of this fact, it not infrequently happens that the starting lever is carelessly or inadvertently manipulated, more commonly by some person other than the operator, to the extent of causing engagement of the clutch mechanism of the machine, while the power is off and the machine is at rest. In that event, when power is subsequently applied to the machine either by a belt shifting operation or by a closing of the switch where the machine is motor driven, an operation of the machine takes place immediately because of the careless or accidental tripping of the clutch while the machine was at rest. If the operator was unaware of the fact that his machine had been tampered with in his absence such unexpected operation of the machine might be the cause of injury to himself or to his work. Moreover, in the case of machines provided individually with an electric motor as the driving means, it is quite possible that the motor would become stalled under the conditions described. The reason for this possibility resides in the fact that, from motives relating to efficiency and economy, the motor provided with many classes of machines is just about of a size to take care of the normal load of the machine when assisted by the momentum of the power pulley on the main shaft. Hence, if the motor be started after the clutch has been engaged the motor must not only start the relatively heavy power pulley in rotation but effect a cycle of operations of the machine. As stated, this may result in stalling the motor, particularly if the work performed by the machine require considerable power and a piece of work be in position to be operated on at the time of the unexpected operation of the machine. It will be understood that stalling of the motor may result in damage to the motor itself and that, at the very least, the power must be turned off and the machine returned to its normal position of rest with the clutch disengaged. The accomplishment of these operations by hand results in the loss of considerable time to the operator even if no damage has been done.

In view of these conditions, it is an object of this invention to provide a simple mechanical locking means for preventing unauthorized tripping of the starting mechanism of a machine, which will be especially effective for the purpose intended and require no attention on the part of the operator.

The invention resides in novel locking means controlled by a moving part of the machine which, as illustrated, moves to locking position with respect to the starting means, when the machine comes to rest, and is held removed from such position after the power has been turned on and the said moving part has attained its normal rate of speed. In the construction shown, the locking device is controlled by the power pulley on the main shaft, the arrangement being such that rotation of the pulley has the effect of withdrawing the locking member from its operative position so that the starting means may be tripped to cause operative connection between the power pulley and the shaft. However, as soon as the power pulley comes to rest when the power is turned off it permits the return of the locking member to its operative locking position with respect to a part of the starting means, conveniently a part which is located adjacent to the clutch controlled by the starting means.

Various novel combinations of parts and improved features of construction will be described in the specification and pointed out in the appended claims.

Figure 3:
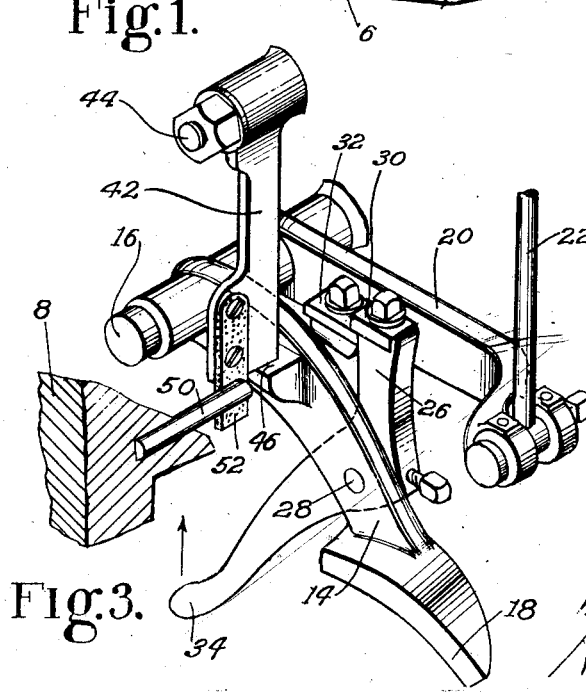

In the drawing;

Fig. 1 is a view of the starting mechanism and the locking means therefor viewed from the end of the shaft which carries the power pulley, Fig. 2 is a view looking from the right in Fig. 1; and Fig. 3 is a perspective view partly in section showing the parts as they are arranged in Fig. 1.

In the illustrative construction there is shown a shaft 6 upon which is mounted loosely, for rotation on the shaft, a pulley 8, there being provided a clutch mechanism of any well known type for operatively connecting the pulley to the shaft. It will be understood that the pulley is a constantly rotating pulley designed to transmit motion to the shaft when it is connected thereto through the clutch which is under the control of the operator. In the clutch construction shown there is provided an element 12 adapted to be moved in one direction, namely, to the right in Fig. 2, to cause disconnection of the clutch with respect to the power pulley 8. For moving the element 12 in this direction there is provided a cam lever 14 pivoted upon a fixed bearing 16 and having a cam end 18 adapted to move the member 12 to the right in Fig. 2. When the lever 14 is lifted to withdraw the cam end 18, the clutch element 12 is projected toward the left by a spring, not shown, to cause a clutching operation, by which the power pulley 8 is connected to the shaft 6. For lifting the cam lever 14 to initiate a clutching operation there is provided a lifting lever 20 also pivoted upon the fixed rod 16 and having its outer end pivotally attached to a rod 22 which extends upwardly alongside of the machine frame 23 to be connected to a hand lever, not shown, by which the operator of the machine may readily initiate power operation of the machine. If the lifting lever 20 were directly connected to the cam lever 14 rotation of the shaft would continue so long as the operator maintained the lifting lever 20 in raised position. In order to provide for a one-revolution operation of the machine a releasable connection is arranged between the lifting lever 20 and the cam lever 14, the said connection comprising a latch 26 pivoted at 28 upon the cam lever 14 and having at its upper end a plate 30 normally overlying a similar plate 32 extending outwardly from and securely attached to the lifting lever 20. It will be understood that when the lifting lever 20 is moved upwardly it will carry the cam lever 14 upwardly because of the interengagement of the plates 30 and 32. Upward movement of the cam lever 14 initiates the throwing in of the clutch, as above described, and as soon as this takes place a projection (not shown) on the shaft 6 strikes the tail 34 of the latch 26 moving it in the direction of the arrow to cause unlatching of the plates 30 and 32 so that the cam lever 14 immediately drops to its original position with the cam 18 in such a location that it may move the element 12 to the right in Fig. 2, thereby causing disconnection of the clutch from the power pulley at the end of one revolution of the shaft. At the same time, the brake band 40 is applied to bring the shaft to a stop. For a more detailed description of the clutch and starting mechanism reference should be had to United States Letters Patent No. 1,011,903, granted Dec. 19, 1911, on application of Arthur Bates.

In order to prevent the throwing in of the clutch when the power pulley 8 is at rest there is provided, in the illustrative construction, a locking member 42 pivoted upon a fixed pin 44 supported upon any stationary part of the machine frame 23 that is most suitable for the purpose, the said locking member being gravity-operated so as to position its lower end over an abutment 46 extending from the side of cam member 14. It will be understood that so long as the locking member 42 occupies the position shown and described, it will be impossible to lift the cam member 14 to initiate a clutching operation by which power would be transmitted to the shaft 6. Accordingly, means is provided for moving the locking member 42 away from the abutment 46 when the power pulley is in motion. As shown, this means comprises a pin 50 attached to the power pulley 8 and extending laterally so as to engage the lower end of the locking member 42 to move it away from the abutment 46. In Fig. 1 of the drawing successive positions of the pin 50 are indicated at 50$^a$ and 50$^b$. Preferably the lower end of the locking member 42 is provided with a flexible tab 52 of leather or other suitable material, against which the pin 50 strikes during the rotation of the power pulley 8. Since the power pulley may be traveling at a relatively high speed possibly in the neighborhood of 350 R. P. M., but one pin 50 is necessary to engage with the locking member 42 to move it from the abutment 46 and to maintain it in inoperative position by constantly striking against it. If the pulley be revolved at a considerably slower rate two or more pins 50 may be used to insure that the locking member will not return to operative position over the abutment 46 while the pulley is in motion.

It will be clear from the foregoing description that the locking member 42 will normally be in position above the abutment 46 on the cam lever 14 while the machine is at rest so as to lock the cam member against such movement as would engage the clutch. When the power is applied to cause rotation of the power pulley 8 the locking member 42 is moved to inoperative position with respect to the abutment 46 as soon as the pin 50 strikes the lower end of said member in the first rotation of the pulley 8. As soon as the pulley has attained its normal speed, if not before that time, the pin 50 will be striking against the locking member 42 so frequently as to maintain it in inoperative position, it being probable that the current of air set in motion by the rapidly revolving pulley is also a not inconsiderable factor in maintaining the locking member 42 in its inoperative position at one side of the abutment 46. It will be obvious then that when the power pulley is at rest the locking member 42 will prevent any tripping of the clutch whether intentional or otherwise, thereby removing one source of danger to the operator in placing his machine in operation.

Having thus decribed my invention, what I claim as new and desire to secure by Letters Patent of the United States is:—

1. In a mechanism of the class described, a shaft, a pulley on the shaft, a clutch for operatively connecting the pulley to the shaft, means for locking the clutch in inoperative condition, and positively operated means controlled by a part of the machine which is in motion when the power is on, for moving the locking means to and maintaining it in inoperative position.

2. In a mechanism of the class described, a shaft, a pulley rotatable on the shaft, a clutch for operatively connecting the pulley to the shaft, a member constructed and arranged to lock the clutch in inoperative condition while the pulley is at rest, and means on the pulley operable during each revolution of the pulley for moving the locking member to inoperative position.

3. In a mechanism of the class described, a shaft, a pulley on the shaft, a clutch for operatively connecting the pulley to the shaft, a member for locking the clutch in inoperative condition, and a member mounted on the power pulley for positively moving the first-mentioned member to unlocking position and for maintaining the first-mentioned member in such position.

4. In a mechanism of the character described, a shaft, a power pulley rotatable on the shaft, a clutch for operatively connecting the power pulley to the shaft, means for locking the clutch in inoperative position, and means on the pulley arranged to contact with the locking means during the rotation of the pulley for maintaining said locking means in inoperative position.

5. In a mechanism of the character described, a shaft, a power pulley rotatable on the shaft, a clutch for operatively connecting the power pulley to the shaft, starting means under the control of the operator for initiating clutching operations, means for locking the starting means against operation, and means comprising a member movable with the power pulley and arranged for intermittent contact with the locking means for rendering the locking means continuously inoperative during the rotation of the power pulley.

6. In a mechanism of the character described, a shaft, a pulley rotatable on the shaft, a clutch for operatively connecting the pulley to the shaft, starting means for initiating clutching operations, a member movable into position for locking the starting means against operation while the pulley is at rest, and a member directly operated by the pulley for holding the locking member out of such position when the pulley has attained its normal rate of speed.

7. In a mechanism of the character described, a shaft, a pulley rotatable on the shaft, a clutch for operatively connecting the pulley to the shaft, starting means for initiating clutching operations, a member for locking the starting means against operation, and a member fixedly secured to the pulley and operative to move the locking member to inoperative position and to maintain the locking member in such position.

8. In a mechanism of the character described, a shaft, a power pulley rotatable on the shaft, a clutch for operatively connecting the pulley to the shaft, a member adjacent to the pulley but disconnected therefrom for locking the clutch in inoperative condition while the pulley is at rest, and means operable upon each revolution of the pulley for moving the locking member to inoperative position to render the clutch operable at any time after the pulley has attained its normal rate of speed.

9. In a mechanism of the character described, a shaft, a power pulley rotatable on the shaft, a clutch for operatively connecting the pulley to the shaft, a member for locking the clutch in inoperative condition while the pulley is at rest, and a member rigidly connected to the pulley so as to be moved in a definite path therewith for holding the locking member in inoperative position while the pulley is rotating.

10. In a mechanism of the character described, a shaft, a power pulley rotatable on the shaft, a clutch for operatively connecting the pulley to the shaft, starting means under the control of the operator for initiating clutching operations, a member for locking the starting means against movement while the pulley is at rest, and a member projecting from the pulley and operable periodically during the rotation of the pulley for maintaining the locking member in inoperative position when the pulley is rotating.

11. In a mechanism of the character described, a shaft, a power pulley rotatable on the shaft, a clutch for operatively connecting the pulley to the shaft, starting means, under the control of the operator for initiating clutching operations, a member pivoted so as to move by gravity into position to lock the starting means against movement, and a member carried by the pulley and operative during rotation of the latter to move the first mentioned member to inoperative position in order to render the starting means continuously operative during rotation of the pulley.

12. In a mechanism of the character described, a frame, a shaft mounted in the frame, a power pulley rotatable on the shaft, a clutch for operatively connecting the pulley to the shaft, starting means comprising a clutch controlling lever movable to initiate a clutching operation, a member connected to the frame for holding the clutch lever against movement, and a member carried by the power pulley operative when the power pulley is running for engaging the holding member to maintain it in inoperative position.

13. In a mechanism of the character described, a shaft, a power pulley rotatable on the shaft, a clutch for operatively connecting the pulley to the shaft, starting means comprising a clutch controlling lever movable to initiate a clutching operation, a member for holding the clutch lever against movement, and means controlled by the power pulley for positively moving the holding member to inoperative position and holding it there during rotation of the pulley.

14. In a mechanism of the character described, a shaft, a power pulley rotatable on the shaft, a clutch for operatively connecting the pulley to the shaft, starting means comprising a clutch controlling lever provided with an abutment, a locking member for co-operating with the abutment to hold the clutch lever against such movement as would initiate a clutching operation, and a member projecting from the power pulley in position to strike the locking member to move it to inoperative position upon rotation of the pulley.

15. In a mechanism of the character described, a shaft, a power pulley rotatable on the shaft, a clutch for operatively connecting the pulley to the shaft, starting means comprising a clutch controlling lever provided with an abutment, a locking member for co-operating with the abutment to hold the clutch lever against such movement as would initiate a clutching operation, said locking member having a flexible extension, and a member carried by the pulley so as to strike the flexible extension on the locking member upon rotation of the pulley whereby the locking member is moved to inoperative position and maintained there during rotation of the pulley.

In testimony whereof I have signed my name to this specification.

PATRICK JOSEPH O'SULLIVAN.